(12) United States Patent
Tateishi et al.

(10) Patent No.: US 11,712,757 B2
(45) Date of Patent: Aug. 1, 2023

(54) LASER PROCESSING METHOD

(71) Applicant: Via Mechanics, Ltd., Kanagawa (JP)

(72) Inventors: Kaori Tateishi, Kanagawa (JP); Yasushi Ito, Kanagawa (JP)

(73) Assignee: VIA MECHANICS, LTD., Kanagawa-ken (JP)

( * ) Notice: Subject to any disclaimer, the term of this patent is extended or adjusted under 35 U.S.C. 154(b) by 327 days.

(21) Appl. No.: 15/956,094

(22) Filed: Apr. 18, 2018

(65) Prior Publication Data
US 2018/0318965 A1 Nov. 8, 2018

(30) Foreign Application Priority Data

May 8, 2017 (JP) .................................. 2017-092137

(51) Int. Cl.
| | | |
|---|---|---|
| *B23K 26/386* | (2014.01) | |
| *B23K 26/40* | (2014.01) | |
| *C03C 15/00* | (2006.01) | |
| *C03C 23/00* | (2006.01) | |
| *B23K 26/18* | (2006.01) | |

(Continued)

(52) U.S. Cl.
CPC ........ *B23K 26/386* (2013.01); *B23K 26/0622* (2015.10); *B23K 26/18* (2013.01); *B23K 26/384* (2015.10); *B23K 26/389* (2015.10); *B23K 26/40* (2013.01); *B23K 26/402* (2013.01); *C03C 15/00* (2013.01); *C03C 23/0025* (2013.01); *B23K 2103/54* (2018.08)

(58) Field of Classification Search
CPC ............. B23K 26/386; B23K 26/0622; B23K 26/384; B23K 26/18; B23K 26/40; B23K 26/402; B23K 26/38; B23K 26/382; C03C 15/00

USPC ............... 219/121.68, 121.69, 121.7, 121.71
See application file for complete search history.

(56) References Cited

U.S. PATENT DOCUMENTS

| | | | |
|---|---|---|---|
| 2012/0196071 A1* | 8/2012 | Cornejo ................... | B28D 1/00 428/43 |
| 2015/0060402 A1* | 3/2015 | Burkett ................... | C03C 15/00 216/41 |

(Continued)

FOREIGN PATENT DOCUMENTS

| | | |
|---|---|---|
| JP | H0230390 A | 1/1990 |
| JP | 2016056046 A | 4/2016 |

(Continued)

OTHER PUBLICATIONS

Machine translation of JP 2016-222485 performed on Aug. 11, 2021.*

(Continued)

*Primary Examiner* — Tu B Hoang
*Assistant Examiner* — Alba T Rosario-Aponte
(74) *Attorney, Agent, or Firm* — Nixon Peabody LLP

(57) ABSTRACT

Provided is a laser processing method for drilling a hole in a glass substrate with using a carbon dioxide laser, including the steps of: irradiating the laser onto a drilling position on the glass substrate from a side of the glass substrate on which a protective sheet is adhered so as to form a blind hole; removing the protective sheet from the glass substrate and performing an annealing treatment; and performing a wet-etching process on a side of the glass substrate not irradiated with the laser so as to convert the blind hole into a through hole.

2 Claims, 2 Drawing Sheets

Figure 1A:
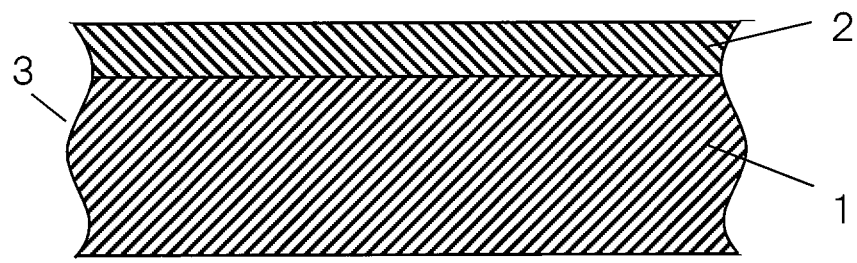

(51) Int. Cl.
*B23K 26/384* (2014.01)
*B23K 26/0622* (2014.01)
*B23K 26/402* (2014.01)
*B23K 26/382* (2014.01)
*B23K 103/00* (2006.01)

(56) References Cited

U.S. PATENT DOCUMENTS

| | | | | |
|---|---|---|---|---|
| 2016/0251251 | A1* | 9/2016 | Hirayama | C03B 33/0222 |
| | | | | 65/105 |
| 2017/0088457 | A1* | 3/2017 | Mori | C03C 23/0025 |
| 2018/0340262 | A1* | 11/2018 | Hiranuma | C23F 1/16 |

FOREIGN PATENT DOCUMENTS

| JP | 2016534017 A | | 11/2016 |
|---|---|---|---|
| JP | 2016222485 A | * | 12/2016 |
| JP | 2016222485 A | | 12/2016 |
| JP | 2017061401 A | | 3/2017 |

OTHER PUBLICATIONS

European Search Report for Application No. EP 18 17 0379, dated Oct. 18, 2018.
Notice of Reasons for Refusal for Application No. 2017-092137, dated Jan. 14, 2021.

\* cited by examiner

LASER PROCESSING METHOD

CROSS-REFERENCE TO RELATED APPLICATION

The present application claims priority from Japanese Patent Application No. 2017-92137 filed on May 8, 2017, the content of which is hereby incorporated by reference into this application.

TECHNICAL FIELD OF THE INVENTION

The present invention relates to a laser processing method suitable for drilling a hole in a glass substrate with using a carbon dioxide laser.

BACKGROUND OF THE INVENTION

In recent years, lasers have been studied as a means for drilling a hole in a glass substrate. A carbon dioxide laser is expected to have high output and high productivity, but one problem is that this laser occasionally causes cracks to form in the glass substrate.

As an example of a laser processing method capable of drilling a hole in a glass substrate without forming any cracks, Patent Document 1 (Japanese Patent Application Laid-Open Publication No. 2016-222485) discloses a laser processing method comprising the steps of: irradiating a carbon dioxide laser onto a drilling position on the glass substrate from a side of the glass substrate on which a protective sheet is adhered so as to form a blind hole; removing the protective sheet from the glass substrate and performing an annealing treatment; and performing a polishing process on a side of the glass substrate not irradiated with the laser so as to convert the blind hole into a through hole.

In this processing method, the entire through hole is not formed at the stage of laser processing, so that residual stress applied to the glass substrate can be minimized and cracks can be prevented from forming at the time of laser processing.

However, since a diameter of the completed through hole is smaller on the side not irradiated with the laser, it is disadvantageous in that plating adhesion properties at this portion when conductively plating the hole are decreased.

SUMMARY OF THE INVENTION

An object of the present invention is to provide a laser processing method that is capable of preventing cracks from forming when drilling a hole in a glass substrate with using a carbon dioxide laser, as well as being capable of improving plating adhesion properties when conductively plating the through hole.

A representative laser processing method disclosed in the present application is characterized by comprising the steps of: irradiating the laser onto a drilling position on the glass substrate from a side of the glass substrate on which a protective sheet is adhered so as to form a blind hole; removing the protective sheet from the glass substrate and performing an annealing treatment; and performing a wet-etching process on a side of the glass substrate not irradiated with the laser so as to convert the blind hole into a through hole.

According to the present invention, it is possible to provide a laser processing method that is capable of preventing cracks from forming when drilling a hole in a glass substrate with using a carbon dioxide laser, as well as being capable of improving plating adhesion properties when conductively plating the through hole.

BRIEF DESCRIPTIONS OF THE DRAWINGS

Figure 1B:
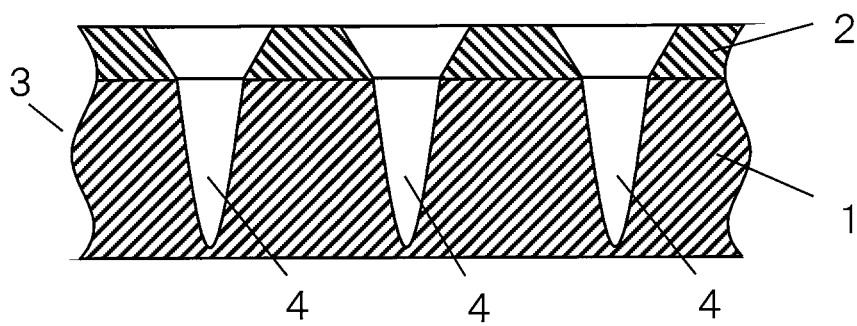
Figure 1C:
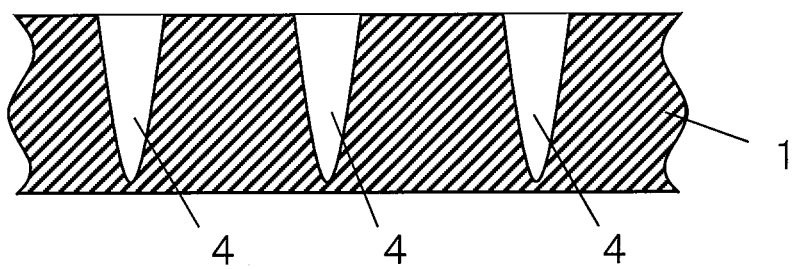
Figure 1D:
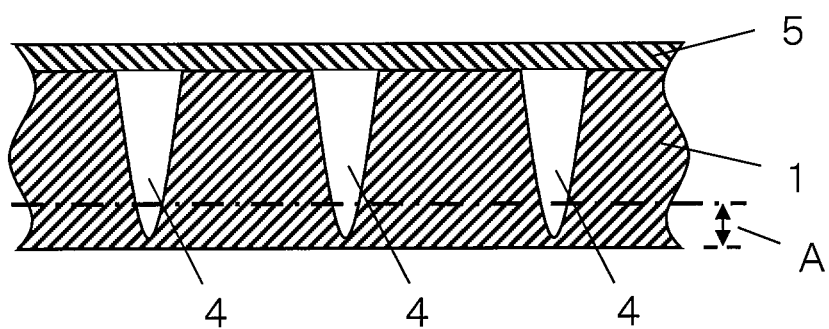
Figure 1E:
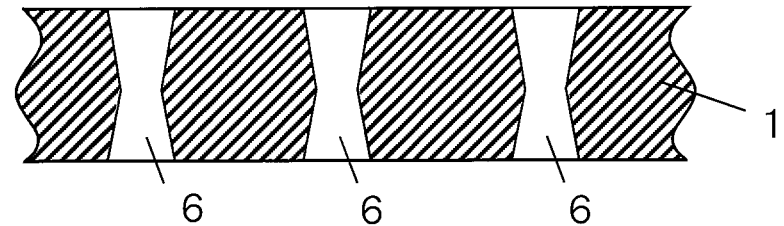
Figure 2:
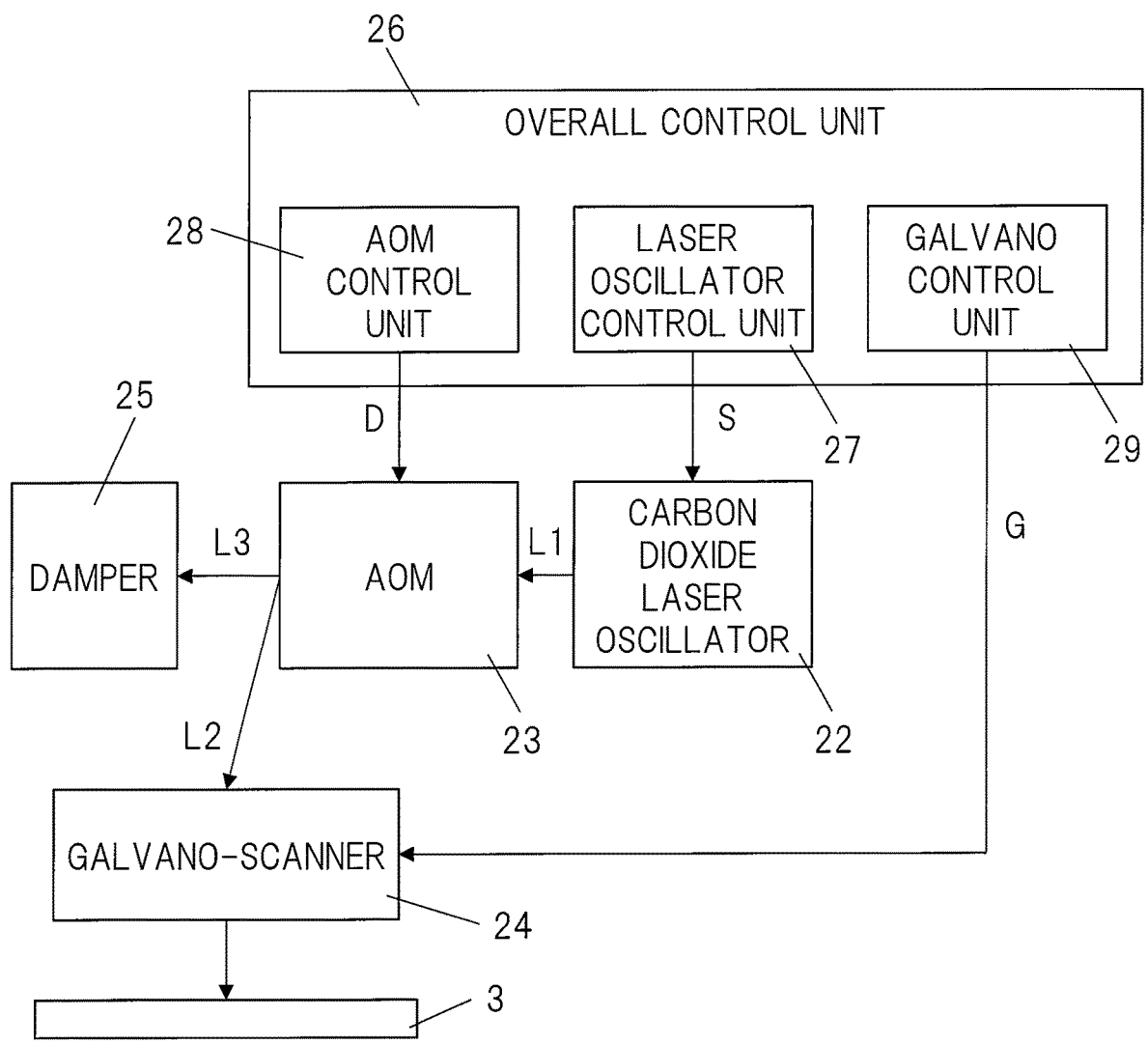

FIGS. 1A to 1E collectively show a process chart for describing a laser processing method according to an embodiment of the present invention, and are cross sectional views each showing a state of a glass substrate; and FIG. 2 is a block diagram showing a laser processing apparatus utilized in the embodiment of the present invention.

DESCRIPTIONS OF THE PREFERRED EMBODIMENTS

A laser processing method according to an embodiment of the present invention will be described.

First, as shown in FIG. 1A, a work substrate 3 having a glass substrate 1 in which a hole is to be drilled and a protective sheet 2 adhered to a surface of the glass substrate 1 is prepared as a first step. The glass substrate 1 is made of a material such as alkali-free glass, and the protective sheet 2 can easily be stripped off without leaving any adhesives on the glass substrate 1 side.

Subsequently, as shown in FIG. 1B, a carbon dioxide laser is irradiated onto a drilling position on the work substrate 3 as a second step so as to form a blind hole 4. In this case, the protective sheet 2 acts to prevent any molten glass components generated by drilling the hole from adhering to the surface of the glass substrate 1.

A block diagram of a laser processing apparatus utilized in this method and having a widely known configuration is shown in FIG. 2. FIG. 2 shows a carbon dioxide laser oscillator 22 for oscillating a laser pulse L1, an acousto-optic modulator (hereinafter referred to as "AOM") 23 for diverting the laser pulse L1 outputted from the carbon dioxide laser oscillator 22 to either of two directions which are a drilling direction and a non-drilling direction, and a Galvano-scanner 24 for sequentially irradiating a laser pulse L2 that was diverted to the drilling direction in the AOM 23 onto each drilling position on the work substrate 3. This Galvano-scanner 24 is rotated such that the laser pulse L2 is scanned across the glass substrate 1. A damper 25 absorbs a laser pulse L3 that was diverted to the non-drilling direction in the AOM 23.

An overall control unit 26 for controlling operations of the entire apparatus includes: a laser oscillator control unit 27 for outputting a laser oscillation command signal S that commands oscillation of each laser pulse L1 in the carbon dioxide laser oscillator 22; an AOM control unit 28 for outputting an AOM drive signal D that controls a diverting operation of the AOM 23; and a Galvano control unit 29 for outputting a Galvano operation control signal G that commands operation of the Galvano-scanner 24.

The laser pulse L1 inputted into the AOM 23 is diverted to the drilling direction as the laser pulse L2 when the ACM drive signal D is ON, whereas the laser pulse L1 is diverted to a direction of the damper 25 in the non-drilling direction as the laser pulse L3 when the AOM drive signal D is not ON.

The Galvano-scanner 24 is stopped when the Galvano operation control signal G is OFF, whereas the Galvano-scanner 24 is rotated when the Galvano operation control signal G is ON. With the Galvano-scanner 24 in a stopped state, the laser is irradiated onto a single drilling position, and the Galvano-scanner 24 is rotated such that the laser is irradiated onto the next drilling position by the laser pulse L2.

In the laser processing apparatus of FIG. 2, the blind hole 4 is formed in the work substrate 3 by performing cycle processing. Cycle processing is a process in which a single laser pulse is irradiated onto each drilling position, the laser pulse is moved to and irradiated onto other drilling positions, and after all drilling positions are irradiated, the same operations are repeated as many times as necessary.

Subsequently, as shown in FIG. 1C, the protective sheet 2 is stripped off from the work substrate 3 having the blind hole 4, and an annealing treatment is performed on the glass substrate 1 in this state as a third step. When the material of the glass substrate 1 is alkali-free glass, it is desirable for the annealing treatment to be performed for 10 minutes at a temperature of 650° C. which is a strain point of the alkali-free glass. When the material of the glass substrate 1 is borosilicate glass, soda-lime glass or the like, it is necessary to change the temperature and time of the annealing treatment. By this annealing treatment, residual stress in the vicinity of the blind hole 4 generated at laser processing in the second step is alleviated.

Subsequently, as shown in FIG. 1D, a protective sheet 5 having a resistance to hydrofluoric acid that is used for wet-etching is adhered to the surface of the glass substrate 1, and wet-etching is then performed on the glass substrate 1 with using hydrofluoric acid as a fourth step. As can be understood from FIG. 1D, it is necessary to set an erosion thickness "A" of this etching process such that at least the blind hole 4 can be converted into a through hole, and this thickness can be controlled by changing conditions of the etching process.

FIG. 1E shows the glass substrate 1 in a state after the etching process is performed and the protective sheet 5 is removed. The side not irradiated with the laser is etched such that the glass substrate 1 having a through hole 6 formed at the drilling position is completed.

According to the above-described embodiment, by forming the blind hole instead of an entire through hole at the stage of laser processing, residual stress applied to the glass substrate 1 can be minimized. In addition, unlike burst processing in which a plurality of laser pulses are consecutively irradiated onto each drilling position, this blind hole is formed by performing cycle processing in which a single laser pulse is irradiated onto each drilling position, the laser pulse is moved to and irradiated onto other drilling positions, and after all drilling positions are irradiated, the same operations are repeated as many times as necessary. Thus, residual stress applied to the glass substrate 1 can be minimized, and cracks can be prevented from forming at the time of laser processing.

By further performing the annealing treatment on the glass substrate 1, residual stress applied to the glass substrate 1 at laser processing is alleviated, so that cracks can be prevented from forming. In addition, by further performing the etching process to complete the through hole, a diameter of the through hole on the side not irradiated with the laser is enlarged, and a cross-sectional shape of the through hole is formed into a substantially X-shape. Thus, plating adhesion properties at this portion can be improved when conductively plating the hole as compared with the conventional art.

Further, by not performing any polishing processes, a maximum area of the glass substrate 1 is prevented from being restricted, and no adverse effects due to polishing powders will occur. In addition, a final thickness of the glass substrate 1 is determined during the etching process, so that accuracy of the thickness can be improved as compared with a case where the thickness is determined according to the polishing process.

Note that, in the above-described embodiment, wet-etching is performed by using hydrofluoric acid. However, this wet-etching solution does not necessarily need to be hydrofluoric acid and may be any other wet-etching solution.

In addition, in the above-described embodiment, wet-etching is performed after the protective sheet 5 having a resistance to hydrofluoric acid is adhered to the side irradiated with the laser. However, if the side not irradiated with the laser is the only side that is capable of being etched, the protective sheet 5 does not need to be adhered to the side irradiated with the laser.

In addition, in the above-described embodiment, the blind hole 4 is formed by performing cycle processing in which a single laser pulse is irradiated onto each drilling position, the laser pulse is moved to and irradiated onto other drilling positions, and after all drilling positions are irradiated, the same operations are repeated as many times as necessary. However, it goes without saying that the operations do not need to be repeated more than once depending on the size of the blind hole 4.

What is claimed is:

1. A laser processing method for forming a through hole in a glass substrate wherein the through hole comprises a portion formed only by laser processing and a portion formed only by wet-etching, the glass substrate having a first surface and an opposed second surface, the method comprising the steps of:

drilling a blind hole in the glass substrate using a carbon dioxide laser;

irradiating the carbon dioxide laser on the first surface of the glass substrate from a side of the first surface of the glass substrate on which a first protective sheet for laser processing is adhered, so as to form the blind hole;

removing the first protective sheet by stripping off the first protective sheet from the first surface of the glass substrate;

thereafter performing an annealing treatment on the glass substrate; and thereafter adhering a second protective sheet for a wet-etching process only on the laser-irradiated first surface of the glass substrate, and performing the wet-etching process on only the opposed second surface of the glass substrate while the second protective sheet remains in place on the laser irradiated first surface of the glass substrate, so as to erode a predetermined thickness of the opposed second surface of the glass substrate to convert the blind hole into the through hole, and continuing the wet-etching process until a cross-section shape of the through hole is formed into an X-shape, wherein the X-shaped through hole comprises a portion which is only laser processed and a portion which is only wet-etched.

2. The laser processing method according to claim 1, wherein a plurality of blind holes are formed in the glass substrate, wherein formation of each one of the plurality of blind holes is formed by performing cycle processing in which a single laser pulse is irradiated onto a drilling position in the glass substrate of a first blind hole, the laser pulse is moved to and irradiated onto another drilling position in the glass substrate of another blind hole, and after all of the drilling positions of all the blind holes of the plurality of blind holes are irradiated, repeating the irradiating and moving the laser pulse onto each drilling position of each one of the plurality of blind holes as many times as necessary to complete the formation of each of the plurality of blind holes in the glass substrate.

* * * * *